United States Patent [19]

Barnidge

[11] 4,198,795
[45] Apr. 22, 1980

[54] STAINLESS STEEL FLOORING

[75] Inventor: Thomas O. Barnidge, Saint Louis, Mo.

[73] Assignee: Barnidge, Inc., St. Louis, Mo.

[21] Appl. No.: 905,975

[22] Filed: May 15, 1978

[51] Int. Cl.$^2$ ............................................. B44D 5/08
[52] U.S. Cl. ......................................... 52/180; 52/581
[58] Field of Search ............... 52/581, 588, 177, 675, 52/180, 673, 579, 181; 119/28

[56] References Cited

U.S. PATENT DOCUMENTS

| 765,963 | 7/1904 | Evans | 52/581 |
|---|---|---|---|
| 3,215,118 | 11/1965 | Behlen | 52/581 X |
| 3,469,509 | 9/1969 | Hutchinson | 52/581 X |

FOREIGN PATENT DOCUMENTS 1236407  6/1970  France ........................................ 52/581

Primary Examiner—Carl D. Friedman
Attorney, Agent, or Firm—Hill, Van Santen, Steadman, Chiara & Simpson

[57] ABSTRACT

A modular flooring for installation on a subfloor and a method for producing it is disclosed. Each modular elongated section is substantially a U-shaped with the central part of the U being the weight bearing floor section.

A series of parallel slots is formed perpendicular to the elongated dimension, in the weight bearing surface of each floor section. The parallel slots each are formed having side members which are folded down so as to achieve a slot which eliminates the presence of fractured metal or cutting edges along the weight bearing portion of the floor section. On one of the supporting side walls of each floor section is punched a pair of slots. On the other supporting side wall of each floor section is punched a pair of locking tabs. The floor sections may be placed adjacent one another so that the tabs extending from the side wall of one floor section will interlock with the slots punched in the adjacent side wall of the next floor section. The interlocking tabs and slots result in easy assembly and positive spacing of arbitrary numbers of the floor sections.

6 Claims, 9 Drawing Figures

U.S. Patent  Apr. 22, 1980  Sheet 1 of 2  4,198,795
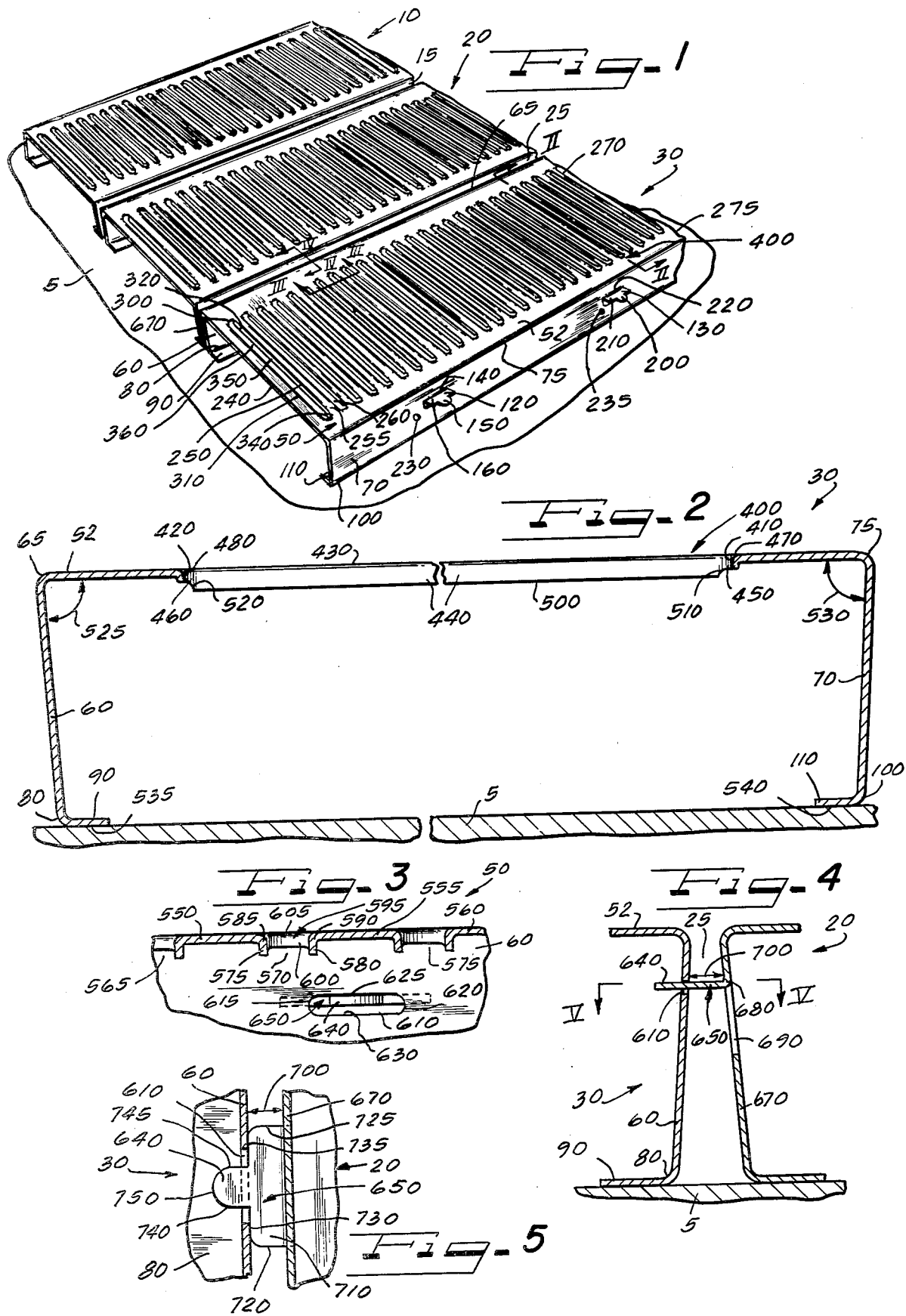

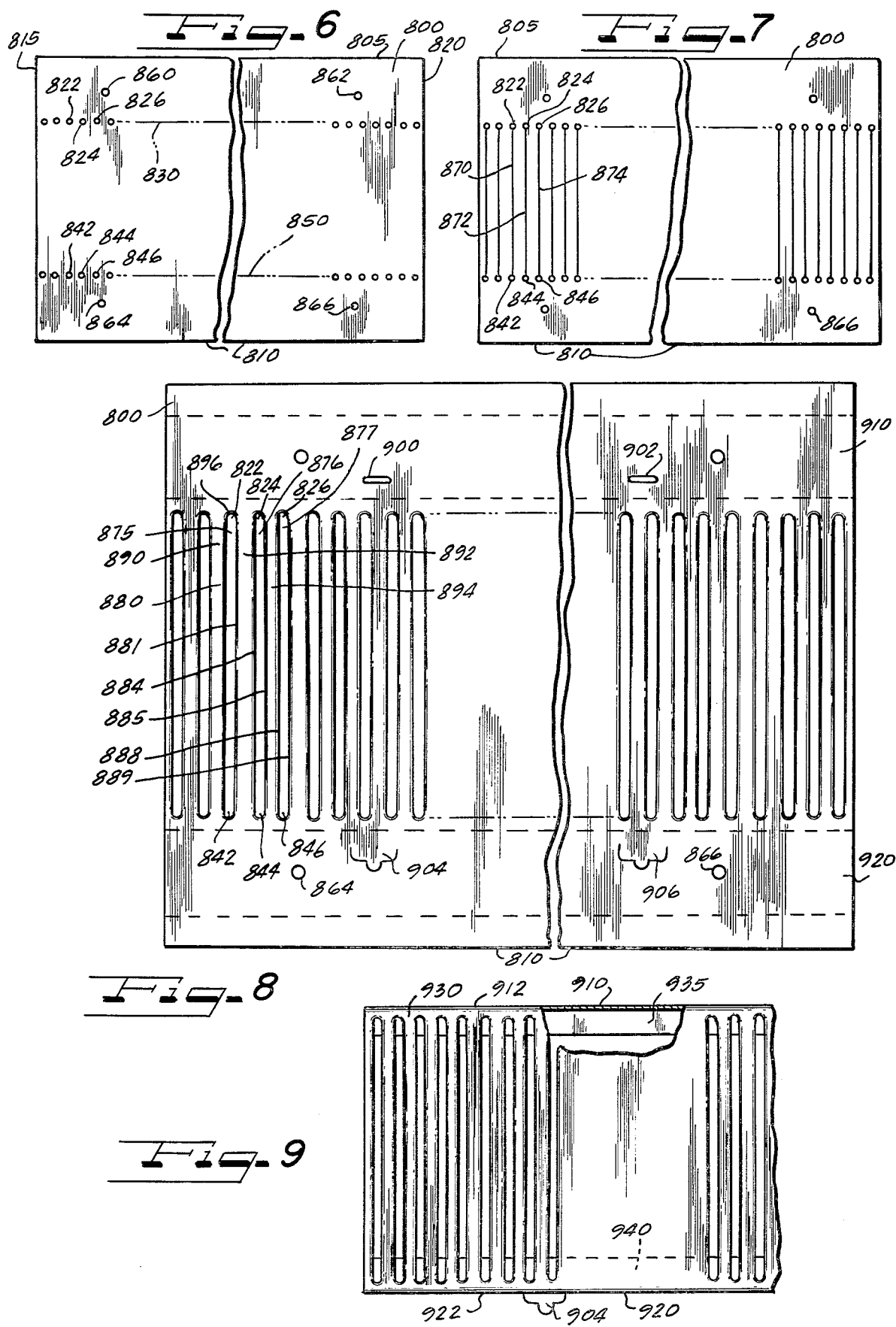

STAINLESS STEEL FLOORING

BACKGROUND OF THE INVENTION

1. Field of the Invention

This invention relates to the field of modular flooring systems for use with animal husbandry.

2. The Prior Art

It has been well known to use different types of floor structures provided with drainage ports in animal husbandry areas. Examples of prior art extruded flooring systems can be found in U.S. Pat. No. 4,048,960 and in the references cited therein. Other types of flooring devices including those having plates with slots therein are disclosed in U.S. Pat. No. 3,307,520. The prior art, however, has not adequately provided a modular flooring system which is inexpensive to construct, which can be assembled out of minimum numbers of members to compose a floor structure while at the same time providing for adequate drainage, and ease of assembly.

SUMMARY OF THE INVENTION

The invention comprises an article of manufacture and a method for producing it. The article of manufacture is a modular floor section with an elongated dimension having a weight bearing portion and two supporting side walls. A series of parallel slots are fabricated in the weight bearing portion perpendicular to the elongated dimension. The slots are formed without fractured metal or cutting edges extending up onto the top surface weight bearing portion of a given floor section which might damage livestock or persons standing on the floor section. Each floor section has a first and a second side wall which support the weight bearing portion of the floor section above the subfloor. The first side wall in each floor section has a pair of slots punched in it. The second side wall has a corresponding pair of tabs punched in it and bent so as to be parallel to the weight bearing portion of the floor section. Adjacent floor sections placed next to one another interlock by having the tabs in the second side wall of one floor section interlock with the slots in the first side wall of an adjacent section. The interlocking tabs and slots allow a number of floor sections to be placed adjacent to one another and interlock with a fixed spacing so as to form a rigid and mechanically stable floor which readily draws water from the top of the weight bearing portion.

The process of producing a typical flooring section comprises the steps of:

1. Forming a piece of sheet metal into a rectangular shape.
2. Forming the ends of each slot in the piece of sheet metal by drilling two sets of holes each with a press drill. Corresponding members of the two sets of holes are on center lines which are perpendicular to one of the edges of the piece of sheet metal.
3. Making a cut between each corresponding pair of previously drilled holes in the piece of sheet metal.
4. Bending and drawing the sheet metal along each side of each of the previously made cuts so as to form a slot between each pair of previously drilled holes. The parallel edges of each of the slots are bent downward away from the weight bearing side of the floor section.
5. The final step consists of bending the first and second side walls at an angle with respect to the weight bearing central portion of each floor section. While each second side wall is being bent with respect to the weight bearing portion of the floor section, the tabs previously punched are bent so as to be parallel with respect to the weight bearing portion of the floor section.

BRIEF DESCRIPTION OF THE FIGURES

FIG. 1 is a fragmentary, partial orthographic view of several assembled floor sections.

FIG. 2 is a planar section taken along the line II—II as indicated in FIG. 1 illustrating the details of a side of a typical slot.

FIG. 3 is a planar section taken along the line III—III as indicated in FIG. 1 illustrating the details of the end of a typical slot in the weight bearing section of the flooring member.

FIG. 4 is a planar section taken along the line IV—IV as defined in FIG. 1 illustrating the relationship between two adjacent flooring sections.

FIG. 5 is a planar section taken along the line V—V as defined in FIG. 4 illustrates the details of the interlocking tab and slot between a pair of adjacent flooring sections.

FIG. 6 is a frontal planar view of a piece of sheet metal illustrates the first step in the fabrication of a typical floor section.

FIG. 7 a planar frontal view of a piece of sheet metal illustrates the second step in the fabrication of a typical floor section.

FIG. 8 a planar frontal view of a piece of sheet metal illustrates the third step in the fabrication of a typical floor section.

FIG. 9 a fragmentary planar frontal view illustrates the last step in the fabrication of a typical floor section.

DETAILED DESCRIPTION OF THE PREFERRED EMBODIMENT

While the principles of the present invention find a particular utility in a stainless steel flooring, it will be understood that the flooring arrangement of the present invention may be utilized in other combinations. By way of exemplary disclosure of the best mode of practising the invention there is shown generally in FIG. 1 a subfloor 5 on which a set of modular elongated sections 10, 20 and 30 utilizing the principles of the present invention are assembled. Between each pair of the sections, 10-20 and 20-30 is a predetermined space 15, 25. Since the sections 10, 20 or 30 are identical, the following discussion of section 30 will be applicable to any of the others. The section 30 has a central weight bearing member 50 with a top surface 52. The member 50 is supported by a pair of side walls 60 and 70 which are located at an angle with respect to the central member 50. The side wall has a break 65 where it joins the central member 50. The wall 70 has a similar break 75. The side wall 60 has a second break 80 which defines a tab 90 that is parallel to the surface 52 and which rests on the subfloor 5. The side wall 70 has a second break 100 which defines a tab 110 also parallel to the surface 52. The side wall 70 has a pair of tabs 120 and 130 which are formed by a punching operation. The tab 120 is joined to the member 70 along a seam line 140. The tab 120 has a semicircular end 150 located on a body portion 160 of substantially rectangular shape. In a similar fashion, the tab 130 has a semicircular portion 200 affixed to a rectangular body portion 210 which joins the member 70 along a seam 220. The side wall 70 also has a pair of locating holes 230 and 235 which are used for locating the floor section 30 during manufacture. The central member 50 has a series of slots in the surface 52 which are perpendicular to the elongated dimension. Starting from an end 240 a slot 250 is located in the surface 52 of the central member parallel to the end 240. Next to the slot 250 is a weight bearing region 255. Next to the region 255 is a slot 260 which is parallel to the slot 250. A plurality of identical, parallel slots in the surface 52 extends to a slot 270 at a fragmented end 275 of the section 30. Since all of the slots between the slots 250 and 270 are identical, the following description of the typical pair of slots 250-260 will apply to all of the intervening slots. The slot 250 is substantially of a rectangular shape having a rounded end 300 connected by two parallel sides 310 and 320 to a second rounded end 340. Each of the parallel sides 310 and 320 has a lip such as a lip 350 associated with the side 320 which is folded downward with respect to the surface 52. Folding the lip 350 downward as indicated removes any sharp edges from the top surface 52 of the weight bearing member 50 so as to minimize the chance of injury to livestock or persons on the top surface 52. A central open region 360 is contained within the two semicircular ends 300 and 340 and the two parallel sides 310 and 320. Adjacent to the slot 250 is the rectangularly shaped weight bearing region 255. During fabrication the region 255 is kept as flat as possible to provide a suitable weight bearing surface. Adjacent to the region 255 is the slot 260 which has the same shape and characteristics as the slot 250.

FIG. 2 a cross-section taken along the line II—II shows the detail of a typical slot 400. The slot 400 is identical to the slots 250, 260 and 270. As will be noted from FIG. 2, the slot 400 has a pair of semicircular ends 410 and 420. The semicircular ends 410 and 420 are joined by the straight edge 430. The edge 430 represents the line along which a flap 440 has been bent downwardly with respect to the top surface 52. The effect of bending the flap 440 downwardly at a substantially a right angle to the top surface 52 is to provide a smooth straight edge 430 which will not damage the animals using the flooring sections, such as the sections 10, 20 or 30. The semicircular ends 410 and 420 are formed by press drills and each have a folded tab 450 and 460, respectively, which are joined by a pair of smooth bends 470 and 480, respectively, to the top surface 52. A bottom edge 500 of the tab 440 joins the bent members 450 and 460 at a curved corner 510 and a curved corner 520, respectively. FIG. 2 also shows a section of the two side walls 60, 70 which are attached to the central member 50 by the bends 65 and 75. The side walls 60 and 70 join the central member 50 at a set of identical angles 525 and 530. The angles 525 or 530 are less than 90°. A pair of surfaces 535 and 540 of the tabs 90 and 110 rest on the subfloor 5 and support the structure 30.

FIG. 3 is a section view taken along the line III—III as indicated in FIG. 1, shows the end structure of the slots such as typical slots 240, 250, 270 or 400 of the central member 50 of the floor section 30. A set of three weight bearing sections 550, 555, and 560 on the top surface 52 of the central member 50 separate a set of three slots 565, 570, and 575 in the central member 50. Since the slot 570 is typical of the slots 250, 260, 270, 400, 565 and 575 the description of it will apply equally to the others. The slot 570 has a pair of side members 575 and 580 each of which is joined to the corresponding section 550, 555 of the central member 50 by a right angle bend 585, 590. A semicircular end 595 of the slot 570 is shown having a folded member 600 which also joins the central member 50 along a fold line 605. In the side wall 60 of the floor section 30 is shown a slot 610 having a pair of semicircular ends 615 and 620 joined by a pair of parallel edges 625 and 630. Inserted into the slot 610 is a semicircular end 640 of a tab 650 which is affixed to a side wall 670 of the floor section 20. The tab 650 inserted into the slot 610 causes the floor sections 20 and 30 to be spaced apart by the interval 25 and interlocked with one another so as to provide a stable flooring.

FIG. 4 of section taken along a line IV—IV of FIG. 1 illustrates the relationship between the floor section 20 and the floor section 30 where they interlock with one another. The tab 650 on the side wall 670 of the floor section 20 is shown parallel to the top surface 52 and joined to the side member 670 by a bend 680. A space 690 is left in the side wall 670 due to the tab 650 being bent out to mate with the slot 610 as shown. As will be noted, the sections 20 and 30 are spaced apart by the open area 25 which is determined by the length 700 of the body portion of the tab 650. The semicircular end 640 and the tab 650 is shown extending through the slot 610 in the side wall 60 of the floor member 30.

FIG. 5 of section taken along a line V—V of FIG. 4, illustrates the detail of the tab 650 which is typical of the other tabs, such as the tab 120 or the tab 130. The floor sections 20 and 30 are separated the distance 700 which is determined by the body portion 710 of the tab 650. The tab 650 has a pair of sides 720 and 725 which are substantially perpendicular to the side wall 670 of the floor member 20. The sides 720 and 725 each intersect a line 730 and 735 of the edge of the body 710. The edges 730 and 735 intersect a pair of perpendicular edges 740 and 745 which form the sides of the semicircular tab 640 having a rounded end 750. The tab 640 with the rounded end 750 extends through the slot 610 in the side wall 60 of the floor member 30.

The sections 10, 20 and 30 which have been shown are strictly illustrative and are by no means a limitation, the sections may be made any desired or practical length and may be assembled next to one another to produce a floor of arbitrary length and width. A typical suitable material for fabricating the example floor modules is 14 or 16 gage stainless steel. The example modules have elongated dimensions of 10–12 feet with a weight bearing surface being approximately 11-½ inches wide. Typical slots are spaced on ⅞ centers and are about ⅜ inch wide. The round ends are formed with a ¼" diameter press drill.

FIG. 6 illustrates the first step in the method of preparing floor sections such as the sections 10, 20 or 30. A piece of 800 of appropriate sheet metal such as stainless steel is formed so as to have a substantially rectangular shape with a side 805 being parallel to a side 810. A pair of ends 815 and 820 are perpendicular to the parallel sides 805 and 810 and define the length of the finished floor module. A plurality of pairs of holes such as the typical pairs 822, 842, 824-844, 826-846 are drilled with a press drill along a pair of center lines 830 and 850. The hole spacing along the center lines 830, 850 is approximately ⅞ of an inch and each of the holes has a ¼" radius. The centerlines 830 and 850 are parallel to the edges 805, 810. The centerlines joining each of the hole pairs 822 and 842, 824 and 844, 826 and 846 are all parallel to one another and are perpendicular to the edges 805 or 810. The spacing between any given pair of holes such as the holes 822 and 842 is approximately 8-⅜". Because a press drill is used for cutting the holes 822, 824, 826, 842, 844 and 846 no jagged edges of metal are left on the surface of the piece of sheet metal 800. A set of four holes 860, 862, 864 and 866 is drilled in the sheet 800 for positioning purposes while manufacturing the module.

The second step of manufacturing process is shown in FIG. 7. For each of the previously drilled hole pairs such as the hole pairs 822-842, 824-844, 826-846, a cut is made in the sheet metal 800 such as a series of cuts 870, 872 and 874. The series of cuts 870, 872, and 874 are parallel to one another, perpendicular to the edges 805 and 810 and in each case join the centerlines of the corresponding hole pairs.

FIG. 8 illustrates the third step in the manufacturing process, the forming of the metal slots. The sheet metal on each side of the cuts 870, 872 and 874 is bent so as to form a slot having a pair of parallel sides 880 and 881, 884 and 885, 888 and 889. The three pairs of sides join the pairs of holes 822-842, 824-844, 826-846. During the drawing process when the sheet metal on each side of the cuts 870, 872, and 874 is being bent so as to form the slots 875, 876 and 877 the intervening sections of sheet metal such as sections 890, 892 and 894 should be held as flat as possible and should be made as wide as possible for the preferred result. In addition to the drawing operations wherein the slots 875, 876, 877 are created, a pair of slots 900 and 902 is punched in the sheet metal 800. Further, a pair of tabs 904 and 906 is also punched in the sheet metal in this step of the process.

FIG. 9 illustrates the final step of the manufacturing process wherein the piece of sheet metal 800 is bent to form the side members in a standard fashion such as by means of a break. A pair of regions 910 and 920 on the piece of sheet metal 800 are each bent on the lines 912, 922 so as to form an angle of less than 90° between a top section 930 and the two side members 910 and 920. During the process when the side member 920 is being bent along the seam 922 the tab 904 which was previously punched is bent outwards from the side member 920 so as to be parallel to the top surface 930. Finally, a second break is made in each of the side members 910 and 920 so as to form a pair of support members 950 and 940 which also are parallel to the surface member 930.

The tabs such as the tabs 120, 130 each have a body portion such as the body portion 160 and an attached auxiliary portion such as the auxiliary portion 150. Each of the tabs such as the tab 120 or the tab 130 is affixed to the side wall 70 along a first side 140, 220 of the respective body portion 120 or 130 with each respective auxiliary portions 150, 200 being located at a selective spacing 700 from the respective first side 140, 220. When the flooring modules 10, 20, or 30 are assembled adjacent one another, the auxiliary tabs such as the auxiliary tabs 150 or 200 associated with a given floor module extend through an adjacent slot such as the slot 610 of an adjacent floor module with the selected spring 700 associated with each respective body portion such as the body portions 120 and 130 operative to space the two floor modules laterally with respect to one another corresponding to the selected spacing 700.

Although various modifications might be suggested by those skilled in the art, it should be understood that I wish to embody within the scope of the patent warranted hereon all such modifications as reasonably and properly come within the scope of my contribution to the art.

I claim as my invention:

1. A modular floor unit comprising:

a piece of selected and appropriately shaped sheet metal;
said piece of sheet metal being formed into a substantially U-shaped structure having a first and a second supporting side wall with a connected, substantially flat, central weight supporting member;
said weight supporting member having formed therein a plurality of drainage slots;
said first side wall having formed therein an interlocking slot;
said second side wall having formed therein an interlocking tab spatially located so as to fit within an interlocking slot of an adjacent floor section such that said second side wall having said tab is spaced apart from the corresponding slotted side wall of the adjacent floor section;
said tab affixed to said second side wall having a substantially rectangular shape with a semicircular tab affixed to one side thereon;
the width of said substantially rectangular shape determining the spacing between said flooring module and the adjacent flooring module.

2. A modular floor unit comprising:

a piece of selected and appropriately shaped sheet metal;
said piece of sheet metal being formed into a substantially U-shaped structure having a first and a second supporting side wall with a joining weight supporting member;
said weight supporting member having formed therein a plurality of drainage slots;
said first side wall having formed therein an interlocking slot;
said second side wall having formed therein an interlocking tab spatially located so as to fit within an interlocking slot of an adjacent floor section such that said second side wall having said tab is spaced apart from the corresponding slotted side wall of the adjacent floor section;
each of said plurality of slots having a first and a second rounded edge joined by a first and a second parallel side;
said first and second parallel sides comprising a sheet metal tab folded downwardly with respect to a weight bearing surface of said weight supporting member;
said tab affixed to said second side wall having a substantially rectangular shape with a semicircular tab affixed to one side thereof;
the width of said substantially rectangular shape determining the spacing between said flooring module and the adjacent flooring module.

3. A floor module for use in assembling drainable floors for use with animal husbandry comprising:

a suitable piece of rectangularly shaped sheet stock;
said piece of sheet stock having a first and second pair of parallel elongated edges;
a first and second tab being defined upon said piece of sheet stock between said first edge and a first bend parallel to said first edge located at a selected lateral distance with respect to said first edge and between said second edge and a second bend located a selected lateral distance from said first edge;
a first side wall being defined between a third bend and said first bend, said third bend being parallel to said first bend and being located a selected lateral distance from said first bend;

a second wall being defined between a fourth bend and said second bend, said fourth bend being parallel to said second bend and located a selected lateral distance from said second bend;

a substantially flat weight bearing surface defined on said piece of sheet stock between said third bend and said fourth bend;

said substantially flat weight bearing surface having formed therein a plurality of rectangularly shaped flots;

each member of said plurality of rectangularly shaped slots having a center line perpendicular to said first or said second edges;

each member of said plurality of rectangularly shaped slots having a first and a second rounded end joined by a first and a second set of parallel sides;

said first and said second rounded ends each having a tab which is folded down with respect to said weight bearing surface;

each of said first and said second edges of each member of said plurality of slots having a tab affixed thereto which is folded downwardly with respect to a weight bearing surface of said weight bearing member;

said first side wall having at least a first slot located thereon;

said second side wall having a third tab selectively located with respect to said slot on said first side wall so that said third tab on said second side wall can intersect and mate with a slot in the side wall of an adjacent floor module which corresponds to the said slot in said first side wall;

said third tab being operative to laterally space apart said floor module and the adjacent floor module;

said third tab comprising a substantially rectangular body portion affixed to said second side wall along an elongated dimension of said body portion;

said tab having further a semicircular extension affixed to a second elongated dimension of said body member;

said body member having a selected width;

said selected width of said body member determining the lateral spacing which exists between said floor module and the adjacent interlocking floor module.

4. A floor comprising a plurality of U-shaped flooring modules;

each member of said plurality of U-shaped flooring modules having an elongated structure with a first and a second wall joined by a substantially flat weight bearing surface;

said first and said second side walls being capable of supporting said weight bearing surface off of a subfloor;

said weight bearing surface of each member of said plurality of module flooring sections having fabricated therein a series of elongated drainage slots oriented such that said elongated slots are perpendicular to said elongated dimension of said module;

each member of said series of drainage slots having a first and a second rounded end joined by a first and a second parallel side;

each of said first and second parallel sides being formed with a metal flange affixed to said top weight bearing surface and extending downwardly therefrom;

each member of said plurality of floor modules having a mating tab located in said first side wall with a corresponding slot located in said second side wall so that as said members of said plurality of floor modules are assembled adjacent to one another, said tab affixed to a first side wall of said first floor module interlocks a said slot affixed to said second side wall of said adjacent floor module;

each said tab having a body portion and an attached auxiliary portion;

each said tab being affixed to said first side wall along a first side of said body portion with said auxiliary portion located at a selected spacing from said first side whereby a said auxiliary tab associated with a said first floor module is operable to extend through a said slot of a said adjacent floor module with said selected spacing operative to space said first floor module laterally with respect to said second floor module.

5. An improved modular flooring unit having a piece of selected and appropriately shaped sheet metal;

said piece of sheet metal being formed into a substantially U-shaped structure having a first and a second supporting side wall with a connecting, substantially flat weight supporting member;

the weight supporting member having formed therein a plurality of drainage slots;

the first side wall having formed therein an interlocking slot;

the second side wall having formed therein an interlocking tab spatially located so as to fit within an interlocking slot of an adjacent floor section;

the improvement comprising an improved locking tab having a body portion and an attached auxiliary portion, each said tab being affixed to the second side wall along a first side of said body portion with said auxiliary portion located at a selected spacing from said first side, whereby a said auxiliary tab associated with a said first floor module is operable to extend through a said slot of a said adjacent floor module with said selected spacing operative to space said first floor module laterally with respect to said second floor module.

6. The modular floor unit, according to claim 3, wherein each of said first and second rounded edges has a tab affixed thereto which is folded downwardly with respect to said weight bearing surface of said weight supporting member.

* * * * *